United States Patent
Yuan et al.

(10) Patent No.: US 10,637,587 B2
(45) Date of Patent: Apr. 28, 2020

(54) COMMUNICATIONS APPARATUS AND WIRELESS COMMUNICATIONS DEVICE (71) Applicant: Huawei Technologies Co., Ltd., Shenzhen, Guangdong (CN)

(72) Inventors: Peng Yuan, Shanghai (CN); Huafeng Zhang, Shanghai (CN); Yuehua Luo, Shanghai (CN); Shijuan Jia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/015,564

(22) Filed: Jun. 22, 2018

(65) Prior Publication Data

US 2018/0302175 A1 Oct. 18, 2018

Related U.S. Application Data (63) Continuation of application No. PCT/CN2015/098307, filed on Dec. 22, 2015.

(51) Int. Cl.
*H04B 15/00* (2006.01)
*H01Q 3/36* (2006.01)
*H04B 7/06* (2006.01)

(52) U.S. Cl.
CPC ............... *H04B 15/00* (2013.01); *H01Q 3/36* (2013.01); *H04B 7/0617* (2013.01)

(58) Field of Classification Search
CPC combination set(s) only.
See application file for complete search history.

(56) References Cited

U.S. PATENT DOCUMENTS

| | | | |
|---|---|---|---|
| 6,336,033 B1 | 1/2002 | Yamaguchi et al. | |
| 7,427,953 B2* | 9/2008 | Chiang | H01Q 3/40 342/373 |
| 7,812,759 B2* | 10/2010 | Kai | G01S 7/352 342/107 |
| 8,675,763 B2* | 3/2014 | Lindgren | H04B 7/0417 375/267 |
| 10,228,443 B2* | 3/2019 | Kulaib | G01S 5/04 |
| 2002/0137547 A1* | 9/2002 | Judson | H01Q 1/246 455/562.1 |
| 2003/0112172 A1* | 6/2003 | Shinoda | G01S 13/4463 342/70 |

(Continued)

FOREIGN PATENT DOCUMENTS

| | | |
|---|---|---|
| CN | 1507673 A | 6/2004 |
| CN | 101651480 A | 2/2010 |

(Continued)

OTHER PUBLICATIONS

JP/2018-532555, Office Action, dated Jun. 25, 2019.

*Primary Examiner* — Linda Wong
(74) *Attorney, Agent, or Firm* — Leydig, Voit & Mayer, Ltd.

(57) ABSTRACT

Embodiments of the present disclosure relate to a communications apparatus and a wireless communications device. The communications apparatus includes M communications sublinks including M sub antenna arrays divided into at least two rows. Two adjacent sub antenna arrays are arranged in an interleaved manner, or the M sub antenna arrays are arranged on a straight line, and the two adjacent sub antenna arrays share n elements.

12 Claims, 9 Drawing Sheets

(56) References Cited

U.S. PATENT DOCUMENTS

| | | | |
|---|---|---|---|
| 2004/0145526 A1 | 7/2004 | Puente Baliarda et al. | |
| 2005/0012665 A1 | 1/2005 | Runyon et al. | |
| 2006/0176217 A1 | 8/2006 | Lewis | |
| 2007/0287385 A1* | 12/2007 | Stephenne | H04B 7/08 |
| | | | 455/67.11 |
| 2010/0194629 A1 | 8/2010 | Craig et al. | |
| 2011/0134972 A1 | 6/2011 | Zhu et al. | |
| 2013/0028341 A1 | 1/2013 | Ayach et al. | |
| 2015/0054687 A1* | 2/2015 | Reed | H04B 17/0085 |
| | | | 342/361 |
| 2015/0198705 A1* | 7/2015 | Schoor | G01S 13/424 |
| | | | 342/147 |
| 2015/0249291 A1* | 9/2015 | Schmidt | H01Q 1/246 |
| | | | 343/853 |
| 2015/0355313 A1* | 12/2015 | Li | G01S 13/726 |
| | | | 342/195 |
| 2016/0301453 A1* | 10/2016 | Sanderovich | H04B 1/0475 |
| 2016/0308597 A1* | 10/2016 | Kim | H04B 7/0617 |
| 2016/0352002 A1* | 12/2016 | Aue | H01Q 1/246 |
| 2017/0273097 A1* | 9/2017 | Guo | H04W 72/121 |
| 2017/0310000 A1* | 10/2017 | Gustavsson | H01Q 1/246 |
| 2018/0102825 A1* | 4/2018 | Kang | H04B 7/088 |

FOREIGN PATENT DOCUMENTS

| | | | | |
|---|---|---|---|---|
| CN | 101803113 A | 8/2010 | | |
| CN | 102122975 A | 7/2011 | | |
| CN | 102565776 A | 7/2012 | | |
| CN | 102694275 A | 9/2012 | | |
| CN | 103985970 A | 8/2014 | | |
| CN | 104269649 A | 1/2015 | | |
| DE | 3839945 A1 | 5/1990 | | |
| EP | 2176923 B1 * | 5/2018 | | H01Q 1/288 |
| EP | 2176923 B1 | 5/2018 | | |
| JP | 3348863 B2 | 11/2002 | | |
| JP | 2009513035 A | 3/2009 | | |
| JP | 2010200166 A | 9/2010 | | |
| JP | 2014526191 A | 10/2014 | | |
| JP | 2015226291 A | 12/2015 | | |
| KR | 20060114317 A | 11/2006 | | |
| KR | 20130014454 A | 2/2013 | | |
| WO | 2009/013527 A1 | 1/2009 | | |

* cited by examiner

COMMUNICATIONS APPARATUS AND WIRELESS COMMUNICATIONS DEVICE

CROSS-REFERENCE TO RELATED APPLICATIONS

This application is a continuation of International Application No. PCT/CN2015/098307 filed on Dec. 22, 2015, the disclosure of which is hereby incorporated by reference in its entirety.

TECHNICAL FIELD

The present application relates to the mobile communications field, and in particular, to a communications apparatus and a wireless communications device.

BACKGROUND

As wireless communications technologies develop, a communications apparatus of a wireless communications device attracts increasing concern and research. However, in the communications apparatus of the wireless communications device, mutual interference between radio wave beams generated by an antenna array is a main problem to be resolved.

In the prior art, a higher antenna gain and more orthogonal radio wave beams are obtained generally by increasing elements in a sub antenna array (SAA) of an antenna array, so as to reduce mutual interference between radio wave beams. However, research shows that during deflection of the antenna array, a grating lobe does not occur on a radio wave beam generated by the antenna array, only when a distance between adjacent sub antenna arrays is not greater than $0.5\lambda$, where $\lambda$ is a length of the radio wave beam. However, an increase in a quantity of elements in the sub antenna array results in an increase in the distance between the sub antenna arrays. When the distance between the sub antenna arrays is greater than $0.5\lambda$, during deflection of the antenna array, a grating lobe occurs on the radio wave beam generated by the antenna array. When a distance between the sub antenna arrays is increased, the grating lobe becomes more closed to a main lobe. Consequently, it is difficult to control the grating lobe, and orthogonality of the radio wave beams is affected. The orthogonality of the radio wave beams herein means that radio wave beams in two directions do not interfere with each other. Generally, a radio wave beam has energy in both a required direction and another direction. A most severe case is that a grating lobe occurs. That is, the energy in the other direction is the same as that in the required direction. For example, if a direction of a beam B coincides with a direction of a grating lobe of a beam A, the beam B is completely interfered with. In this case, it may be considered that orthogonality of the beam A and the beam B is poor.

Therefore, how to mitigate a contradiction between a quantity of elements and a difficulty in controlling a grating lobe so as to improve orthogonality of a radio wave beam becomes a problem to be resolved.

SUMMARY

Embodiments of the present disclosure provide a communications apparatus and a wireless communications device, so as to improve orthogonality of a radio wave beam.

According to an aspect, an embodiment of the present disclosure provides a communications apparatus, where the communications apparatus includes M communications sublinks, and each communications sublink includes:

one sub antenna array, where each sub antenna array includes N elements, configured to radiate or receive radio wave beams in space;

N analogue phase shifters, where each analogue phase shifter communicates with any element of the N elements, and the N analogue phase shifters are configured to control directions of the radio wave beams, radiated or received by the N elements, in the space;

X transceiver units, communicating with the N analogue phase shifters, and configured to: convert a digital data stream into signals of the radio wave beams, or convert signals of the radio wave beams into a digital data stream; and L digital phase shifters, communicating with the X transceiver units, and configured to: form the digital data stream, or receive the digital data stream and decompose the received digital data stream into multiple digital data streams, where M sub antenna arrays of the M communications sublinks are divided into at least two rows, two adjacent sub antenna arrays are arranged in an interleaved manner, N, M, X, and L are all positive integers, L≤M, and X≤N.

In a possible design, the M sub antenna arrays are divided into an upper row and a lower row, and the two adjacent sub antenna arrays include a first sub antenna array and a second sub antenna array; and if the first sub antenna array is located in the upper row and the second sub antenna array is located in the lower row, the second sub antenna array is located on the lower right of the first sub antenna array; or if the first sub antenna array is located in the lower row and the second sub antenna array is located in the upper row, the second sub antenna array is located on the upper right of the first sub antenna array. Therefore, when elements are increased, a distance between sub antenna arrays can be shortened. This mitigates a contradiction between a large quantity of elements and a requirement for a short distance between the sub antenna arrays to some extent.

In a possible design, a distance between two adjacent elements of N elements in a same sub antenna array is $d_i$, a distance between the adjacent sub antenna arrays is D, $$\sum_{i=1}^{N-1} d_i/2 \le D < \sum_{i=1}^{N-1} d_i, \text{ and } i = 1, 2, \ldots, N-1.$$

In a possible design, each communications sublink further includes N power control units, and each power control unit is connected between any analogue phase shifter of the N analogue phase shifters and one element of the N elements that communicates with the any analogue phase shifter; and the N power control units are configured to perform constant-amplitude weighting processing on signals of radio wave beams sent to the N elements or signals of radio wave beams received from the N elements. Therefore, when a distance between adjacent sub antenna arrays is greater than $0.5\lambda$, a grating lobe generated during deflection of an antenna array can be controlled within a particular range (that is, no grating lobe is generated), and orthogonality of a radio wave beam can be improved.

In a possible design, a phase $(J-1)*\delta$ is injected into the $J^{th}$ analogue phase shifter of the N analogue phase shifters of each communications sublink, J is a positive integer, and J≤N. Therefore, a direction of a radio wave beam, formed in the communications apparatus, in space can be controlled.

In a possible design, a phase $(I-1)*\Delta$ is separately injected into L digital phase shifters of the $I^{th}$ communications sublink of the M communications sublinks, I is a positive integer, and I≤M. Therefore, a direction of a radio wave beam, formed in the communications apparatus, in space can be controlled.

According to another aspect, an embodiment of the present disclosure provides a communications apparatus, where the communications apparatus includes M communications sublinks, and each communications sublink includes:

one sub antenna array, where each sub antenna array includes N elements, configured to radiate or receive radio wave beams in space;

N analogue phase shifters, where each analogue phase shifter communicates with any element of the N elements, and the N analogue phase shifters are configured to control directions of the radio wave beams, radiated or received by the N elements, in the space;

X transceiver units, communicating with the N analogue phase shifters, and configured to: convert a digital data stream into signals of the radio wave beams, or convert signals of the radio wave beams into a digital data stream; and L digital phase shifters, communicating with the X transceiver units, and configured to: form the digital data stream, or receive the digital data stream and decompose the received digital data stream into multiple digital data streams, where M sub antenna arrays of the M communications sublinks are arranged on a straight line, two adjacent sub antenna arrays share n elements, N is an even number, M, X, L, and n are all positive integers, L≤M, X≤N, and 1≤n≤N/2.

In a possible design, the two adjacent sub antenna arrays include a first sub antenna array and a second sub antenna array; and if the first sub antenna array is a sub antenna array located ahead and the second sub antenna array is a sub antenna array located behind, the first n elements of the second sub antenna array are the same as the last n elements of the first sub antenna array; or if the first sub antenna array is a sub antenna array located behind and the second sub antenna array is a sub antenna array located ahead, the last n elements of the second sub antenna array are the same as the first n elements of the first sub antenna array. Therefore, when elements are increased, a distance between sub antenna arrays can be shortened. This mitigates a contradiction between a large quantity of elements and a requirement for a short distance between the sub antenna arrays to some extent.

In a possible design, a distance between two adjacent elements of N elements in a same sub antenna array is $d_i$, a distance between the adjacent sub antenna arrays is D, $$\sum_{i=1}^{N-1} d_i/2 \le D < \sum_{i=1}^{N-1} d_i, \text{ and } i = 1, 2, ..., N-1.$$

In a possible design, each communications sublink further includes N power control units, and each power control unit is connected between any analogue phase shifter of the N analogue phase shifters and one element of the N elements that communicates with the any analogue phase shifter; and the N power control units are configured to perform constant-amplitude weighting processing on signals of radio wave beams sent to the N elements or signals of radio wave beams received from the N elements. Therefore, when a distance between adjacent sub antenna arrays is greater than 0.5λ, a grating lobe generated during deflection of an antenna array can be controlled within a particular range (that is, no grating lobe is generated), and orthogonality of a radio wave beam can be improved.

In a possible design, a phase $(J-1)*\delta$ is injected into the $J^{th}$ analogue phase shifter of the N analogue phase shifters of each communications sublink, J is a positive integer, and J≤N. Therefore, a direction of a radio wave beam, formed in the communications apparatus, in space can be controlled.

In a possible design, a phase $(I-1)*\Delta$ is separately injected into L digital phase shifters of the $I^{th}$ communications sublink of the M communications sublinks, I is a positive integer, and I≤M. Therefore, a direction of a radio wave beam, formed in the communications apparatus, in space can be controlled.

In a possible design, the communications apparatus further includes n*M radio frequency combiners and n*M radio splitters, and the two adjacent sub antenna arrays respectively belong to a first communications sublink and a second communications sublink;

each radio frequency combiner is connected to any element of the n elements, further connected between one analogue phase shifter, communicating with the any element, of the first communications sublink and one analogue phase shifter, communicating with the any element, of the second communications sublink, and configured to: combine signals of radio wave beams received by the two analogue phase shifters, and then send a combined signal to the any element; and each radio frequency combiner is connected to any element of the n elements, further connected between one analogue phase shifter, communicating with the any element, of the first communications sublink and one analogue phase shifter, communicating with the any element, of the second communications sublink, and configured to: split a signal of a radio wave beam received from the any element, and then respectively send split signals to the two analogue phase shifters.

According to still another aspect, an embodiment of the present disclosure further provides a wireless communications device, where the wireless communications device includes the communications apparatus according to the foregoing aspect.

According to yet another aspect, an embodiment of the present disclosure further provides a wireless communications device, where the wireless communications device includes the communications apparatus according to the foregoing another aspect.

According to the communications apparatus and the wireless communications device provided in the embodiments of the present disclosure, the communications apparatus includes M communications sublinks; the M communications sublinks include M sub antenna arrays; and the M sub antenna arrays are divided into at least two rows, and two adjacent sub antenna arrays are arranged in an interleaved manner; or the M sub antenna arrays are arranged on a straight line, and two adjacent sub antenna arrays share n elements. Therefore, a distance between sub antenna arrays can be shortened, a distance between a main lobe and a grating lobe of a radio wave beam can be increased, a contradiction between an increase in a quantity of elements and a difficulty in controlling the grating lobe can be mitigated, and further, orthogonality of the radio wave beam can be improved.

DETAILED DESCRIPTION

The following describes the embodiments of the present disclosure with reference to the accompanying drawings.

Figure 1:
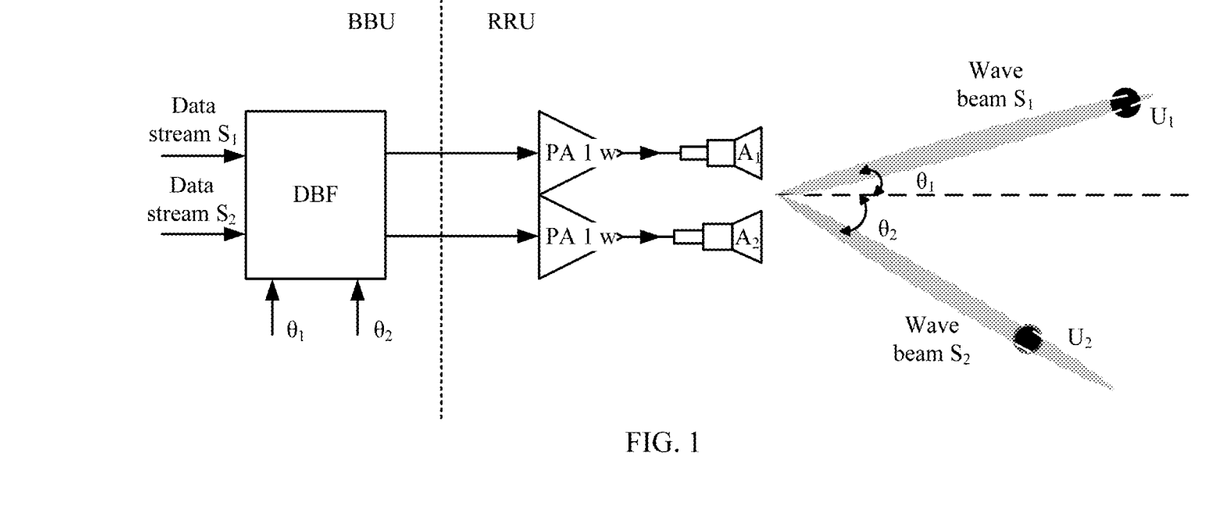
FIG. 1 is a schematic diagram of a manner of driving an antenna array according to the present disclosure.

To resolve a problem of mutual interference between radio wave beams, in the present disclosure, a method in which a size of an antenna array in a communications apparatus is increased (that is, a quantity of elements in a sub antenna array is increased) is used. However, after the size of the antenna array is increased, how to drive the antenna arrays becomes a to-be-resolved problem. The antenna array herein may be a linear array and a planar array. In this specification, that the antenna array is a linear array is described. FIG. 1 is a schematic diagram of a manner of driving an antenna array according to the present disclosure. The driving manner in FIG. 1 is also referred to as a full-digit-based driving manner. In FIG. 1, a baseband unit (BBU) and a remote radio unit (RRU) are two units in a wireless communications device. The wireless communications device herein may be various types of base stations, or a mobile terminal. The BBU is configured to perform digital beamforming (DBF) on an input data stream (for example, $S_1$ or $S_2$), to control a direction of a radio wave beam in space corresponding to the input data stream. The data stream herein may be received from a core network. In an implementation, the performing digital beamforming on an input data stream may be implemented by using a digital amplitude phase weighting device.

In FIG. 1, $\theta_1$ and $\theta_2$ are respectively included angles between the data stream $S_1$ and a normal line of the antenna array and between the data stream $S_2$ and the normal line of the antenna array. The RRU includes a power amplifier (PA), configured to: perform power amplification on a signal received by the digital amplitude phase weighting device, and then output the signal to the antenna array. $A_1$ and $A_2$ are respectively two elements. Multiple elements may form one sub antenna array, and multiple sub antenna arrays may form one antenna array. In addition, $U_1$ and $U_2$ respectively indicate two users. A beam $S_1$ sent to $U_1$ is a radio wave beam generated in space after the BBU and the RRU perform digital beamforming and power amplification on the input data stream $S_1$. A beam $S_2$ sent to $U_2$ is a radio wave beam generated in space after the BBU and the RRU perform digital beamforming and power amplification on the input data stream $S_2$.

It should be noted that, as an example, FIG. 1 merely shows a manner of driving two elements. When a quantity of elements is increased, for example, to n, a quantity of operation times of the BBU changes from originally two to n. That is, a linear increase in the quantity of elements results in a geometrical increase in the quantity of operation times of the BBU, and costs are relatively high. However, in actual application, power consumption of the BBU is expected to be reduced. Therefore, currently, hybrid beamforming (HBF) is more focused on in the industry.

Figure 2:
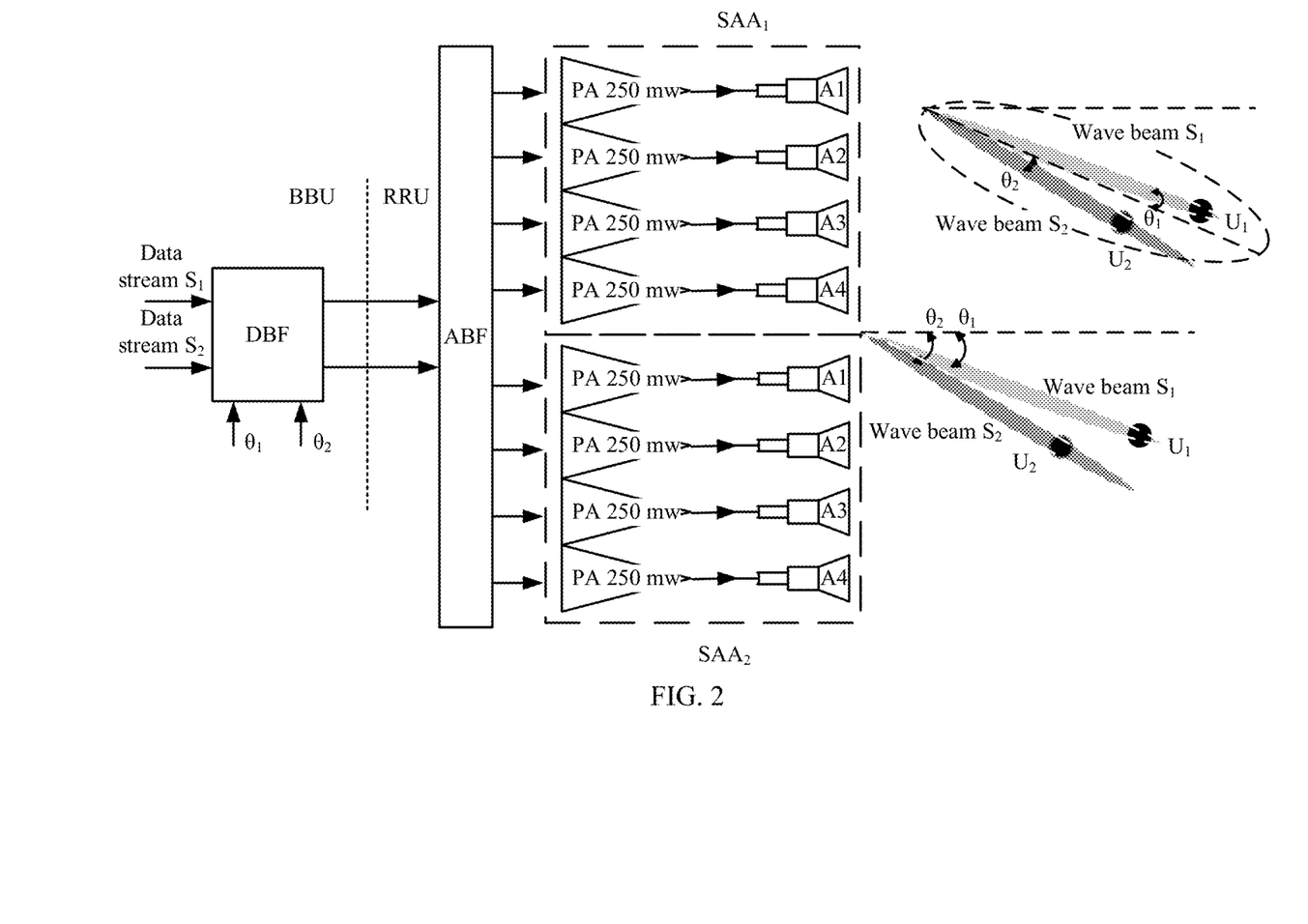
FIG. 2 is a first schematic diagram of another manner of driving an antenna array according to the present disclosure.

FIG. 2 is a first schematic diagram of another manner of driving an antenna array according to the present disclosure. In FIG. 2, a BBU includes a digital amplitude phase weighting device, configured to perform digital beamforming on an input data stream (for example, $S_1$ or $S_2$); and an RRU includes an analogue phase shifter, configured to perform analog beamforming (ABF) on a data stream that has undergone the digital beamforming. Certainly, before the analog beamforming, a digital data stream may first be converted into an analog signal. In FIG. 2, $SAA_1$ and $SAA_2$ are respectively used to indicate two sub antenna arrays. Each sub antenna array includes four elements $A_1$, $A_2$, $A_3$, and $A_4$. That is, compared with FIG. 1, a quantity of elements is increased in FIG. 2. However, when a quantity of input data streams is unchanged, the BBU outputs only two channels of signals. That is, a quantity of operation times of the BBU is unchanged, and only a quantity of corresponding analog channels is increased in the RRU (for example, a quantity of power amplifiers is increased). That is, according to the manner of driving an antenna array, when a quantity of elements is increased, the quantity of operation times of the BBU is not affected. Therefore, a relatively high benefit can be obtained at a relatively low cost. In this specification, the driving manner shown in FIG. 2 is used to drive the antenna array.

Figure 3:
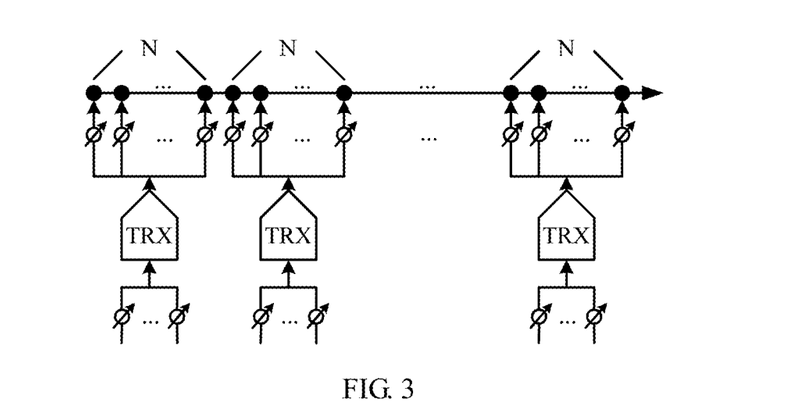
FIG. 3 is a second schematic diagram of another manner of driving an antenna array according to the present disclosure.

It should be noted that, when the antenna array in FIG. 2 includes M SAAs, each SAA includes N elements (that is, the entire antenna array includes N*M elements), and every N elements are driven by one transceiver unit (TRX), for the antenna driving manner in FIG. 2, further refer to FIG. 3. In FIG. 3, a dot indicates an element in FIG. 2; a circle+arrow symbol above a TRX indicates an analogue phase shifter performing ABF; a circle+arrow symbol below a TRX indicates a digital phase shifter, and L*M digital phase shifters form a digital amplitude phase weighting device performing DBF.

It should be noted that FIG. 3 is merely used as an example for description. In actual application, every N elements may be driven by X transceiver units, and X≤N. A principle that X transceiver units drive N elements is the same as a principle that one transceiver unit drives N elements. Details are not described herein again. In addition, each SAA may include a different quantity of elements, and this is not limited in this application.

In FIG. 3, distances between any adjacent elements in an antenna array may be the same or may be different. The distances between any adjacent elements in the antenna array herein are the same, and the same distance is set to d=0.5λ, to describe a problem existing in the prior art. It may be understood that a similar problem exists when the distances between any adjacent elements in the antenna array are different. As described above, when the distances between any adjacent elements in the antenna array are the same distance and d=0.5λ, a center distance between SAAs is Nd, and generally N is a value greater than 1, that is, Nd>0.5λ. Research shows that when the distance between the SAAs is greater than 0.5λ, during deflection of the antenna array, a grating lobe occurs on a radio wave beam generated by the antenna array. When the distance between the SAAs is increased, the grating lobe becomes more closed to a main lobe. Consequently, it is difficult to control the grating lobe, orthogonality of the radio wave beam is affected, and there is no sense in increasing a size of the antenna array.

Therefore, an objective of the present disclosure is to resolve a problem that when the distance between the SAAs is greater than 0.5λ, orthogonality of the radio wave beam is affected because the grating lobe is generated by deflection of the antenna array.

Figure 4:
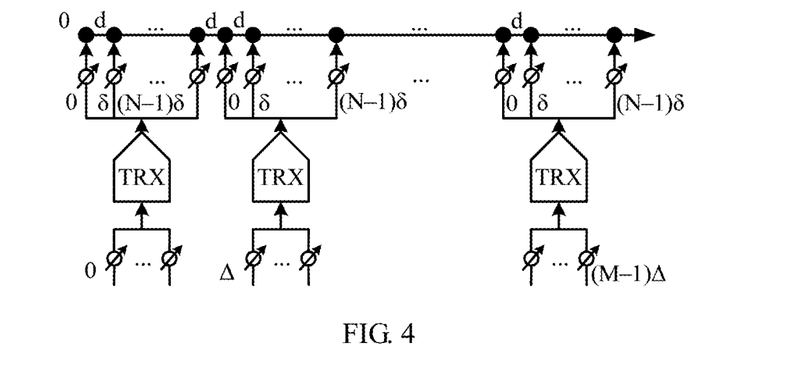
FIG. 4 is a third schematic diagram of another manner of driving an antenna array according to the present disclosure.

Before the solution in the present disclosure is described by using embodiments, the following assumptions are first made to FIG. 3: An arithmetic sequence with a common difference δ is assigned to internal phases of each SAA, and a value 0 is assigned to a phase of a start element (on the leftmost) of each SAA; and an arithmetic sequence with a common difference Δ is assigned to phases below each TRX, and a value 0 is assigned to a phase below a start TRX (on the leftmost). For details, refer to FIG. 4. Then, in FIG. 4, after a data stream that has an included angle θ with respect to a normal line of the antenna array is input, a radio wave beam eventually generated by the antenna array is expressed as a formula 1.

$$AF = 1 + e^{j[kd\,\sin\,\theta+\delta]} + \cdots + e^{j[(N-1)kd\,\sin\,\theta+(N-1)\delta]}$$
$$+ e^{j[Nkd\,\sin\,\theta+\Delta]} + e^{j[(N+1)kd\,\sin\,\theta+\delta+\Delta]} + \cdots +$$
$$e^{j[(N+(N-1)]kd\,\sin\,\theta+(N-1)\delta+\Delta)}$$
$$+ \cdots$$
$$+ e^{j[N(M-1)kd\,\sin\,\theta+(M-1)\Delta]} +$$
$$e^{j[N(M-1)+1]kd\,\sin\,\theta+\delta+(M-1)\Delta)} + \cdots +$$
$$e^{j[N(M-1)+(N-1)]kd\,\sin\,\theta+(N-1)\delta+(M-1)\Delta]}$$
$$= \sum_{n=1,m=1}^{N,M} e^{j[N(m-1)+(n-1)]kd\,\sin\,\theta+(n-1)\delta+(m-1)\Delta)}$$
$$= \sum_{n=1,m=1}^{N,M} e^{j[(n-1)(kd\,\sin\,\theta+\delta)+(m-1)(N\,kd\,\sin\,\theta+\Delta)]}$$
$$= \frac{\sin\left(\frac{N}{2}\psi\right)}{\sin\left(\frac{1}{2}\psi\right)} \cdot e^{j\frac{N-1}{2}\psi} \sum_{m=1}^{M} e^{j[(M-1)\times(N\,kd\,\sin\,\theta+\Delta)]}$$
$$= AF_{SAA} \cdot \frac{\sin\left(\frac{M}{2}\Psi\right)}{\sin\left(\frac{1}{2}\Psi\right)} \cdot e^{j\frac{M-1}{2}\Psi}$$
$$= AF_{SAA} \cdot AF_{ALL}$$

$$\psi = kd\,\sin\,\theta + \delta, \Psi = N\,kd\,\sin\,\theta + \Delta$$

(Formula 1)

In the formula 1, k indicates a quantity of radio wave beams (also referred to as a wave number), and may be solved by using 2π/λ. $AF_{SAA}$ indicates a sub-array factor, that is, a radio wave beam generated by a sub antenna array including N elements in FIG. 4. It can be learned from the formula that a value of $AF_{SAA}$ is associated with variables such as k, d, θ, N, and δ. For different data streams in different directions, the variables are the same for M sub antenna arrays, and radio wave beams generated by the M sub antenna arrays are the same. $AF_{ALL}$ indicates a full-array factor, that is, a radio wave beam generated by M large elements that forms the entire antenna array in FIG. 4, where every N elements form a large element. It can be learned from the formula that a value of $AF_{ALL}$ is associated with variables such as k, d, θ, N, M, and Δ. For different data streams in different directions, Δ is different. Therefore, the entire antenna array may generate different radio wave beams.

With reference to FIG. 4 and the formula, the foregoing problem that the grating lobe is generated by deflection of the antenna array is explained as follows: According to a scanning principle of the antenna array, generally, when $AF_{ALL}$ reaches a maximum value, a signal is strongest. When Ψ is 0, $AF_{ALL}$ reaches the maximum value. According to the formula, Ψ can be equal to 0 by adjusting Δ. However, θ has multiple values within (θ, π). Therefore, when A is configured for the antenna array to deflect a direction of a radio wave beam, a grating lobe is generated.

The following analyzes an inventive concept of the present disclosure:

The radio wave beam generated by the antenna array shown in FIG. 4 may be expressed by using the following formula: $AF=AF_{SAA}*AF_{ALL}$. That is, the radio wave beam eventually generated by the antenna array is a product of the full-array factor and the sub-array factor. Therefore, the radio wave beam eventually generated by the antenna array can be controlled by controlling the sub-array factor, that is, by controlling the radio wave beam generated by the sub antenna array. For example, a distance between sub antenna arrays may be shortened by arranging two adjacent sub antenna arrays in an interleaved manner, so as to control the grating lobe to be at a location relatively far away from a main lobe. In addition, constant-amplitude weighting may be further performed on a signal of a radio wave beam on an element in a sub array antenna, to control that a directivity pattern gain of $AF_{SAA}$ is relatively low at a location at which $AF_{ALL}$ generates the grating lobe, so that an amplitude of the grating lobe of the eventually generated radio wave beam is controlled within a particular range.

Specifically, in the present disclosure, solutions in a first embodiment and a second embodiment are used to improve orthogonality of a radio wave beam.

Figure 5:
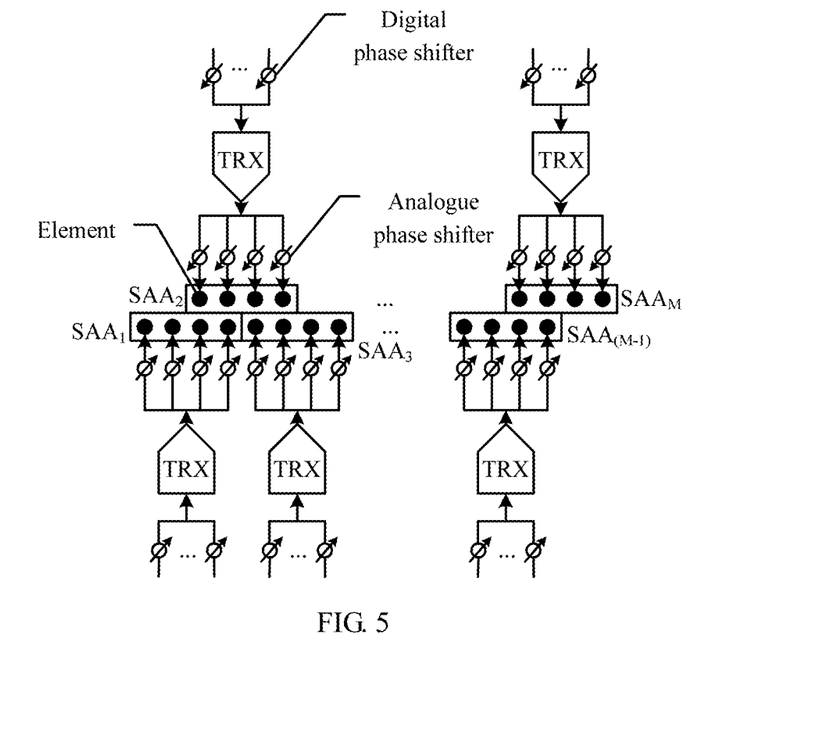
FIG. 5 is a first schematic diagram of a communications apparatus according to a first embodiment of the present disclosure.

FIG. 5 is a first schematic diagram of a communications apparatus according to the first embodiment of the present disclosure. In FIG. 5, the communications apparatus may include M communications sublinks. Each communications sublink may include one sub antenna array, N analogue phase shifters, X transceiver units, and L digital phase shifters. N, M, X, and L are all positive integers. L≤M, and X≤N. Preferably, X is 1. For ease of description, that N is 4 and X is 1 is used in FIG. 5 for description.

In FIG. 5, one sub antenna array includes four elements, configured to radiate or receive radio wave beams in space. Each analogue phase shifter of four analogue phase shifters communicates with any element of the four elements. The four analogue phase shifters are configured to control directions of the radio wave beams, radiated or received by the four elements, in the space. One transceiver unit communicates with the four analogue phase shifters. Specifically, the transceiver unit may communicate with the four analogue phase shifters by using one analog data stream interface. The transceiver unit is configured to: convert a digital data stream into signals of the radio wave beams or convert signals of the radio wave beams into a digital data stream. The L digital phase shifters communicate with the transceiver unit and are configured to: form the digital data stream, or receive the digital data stream and decompose the received digital data stream into multiple digital data streams.

In FIG. 5, M sub antenna arrays include $SAA_1$, $SAA_2, \ldots, SAA_M$. $SAA_2, SAA_4, \ldots, SAA_M$ are arranged in an upper row, and $SAA_1, SAA_3, \ldots, SAA_{M-1}$ are arranged in a lower row. $SAA_2$ is located on the upper right of $SAA_1$, $SAA_3$ is located on the lower right of $SAA_2, \ldots$, and $SAA_M$ is located on the upper right of $SAA_{M-1}$.

It should be noted that, as an example, in FIG. 5, the M sub antenna arrays of the M communications sublinks are divided into the upper row and the lower row. In actual application, the M sub antenna arrays of the M communications sublinks are divided into at least three rows. When the M sub antenna arrays are divided into at least three rows, for a manner of arranging the M sub antenna arrays, refer to the manner of arranging the sub antenna arrays on two rows in FIG. 5. Details are not described herein again in the present disclosure.

Figure 6:
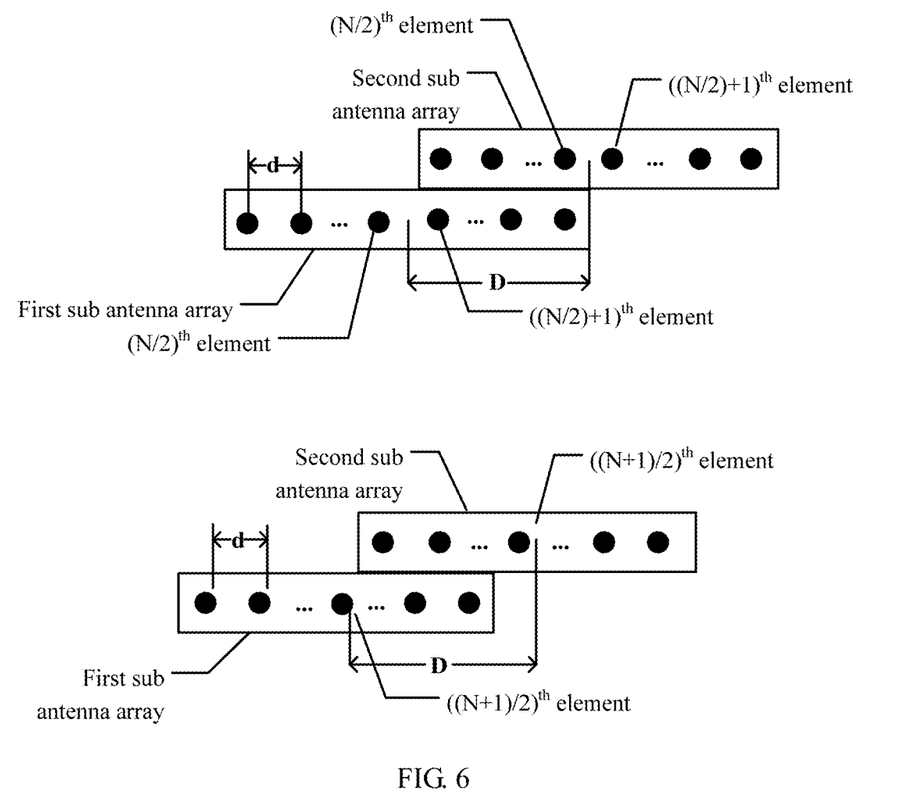
FIG. 6 is a schematic diagram of a distance between adjacent sub antenna arrays according to the present disclosure.

Preferably, when a distance between two adjacent elements of N elements in a same sub antenna array in FIG. 5 is denoted as $d_i$, a distance D between adjacent sub antenna arrays may satisfy the following condition:

$$\sum_{i=1}^{N-1} d_i/2 \leq D < \sum_{i=1}^{N-1} d_i,$$

and $i=1, 2, \ldots, N-1$. It may be understood that, when distances between any adjacent elements in FIG. 5 are the same, $d_i$ may be denoted as d. Correspondingly, D may satisfy the following condition: $(Nd)/2 \leq D < Nd$. Preferably, $D=(Nd)/2$. When the distances between the any adjacent elements are the same, for d and D, refer to FIG. 6. In FIG. 6, it is assumed that the two adjacent sub antenna arrays include a first sub antenna array and a second sub antenna array. When N is an even number, D is a distance between a center location of the $(N/2)^{th}$ element and the $((N/2)+1)^{th}$ element in the first sub antenna array and a center location of the $(N/2)^{th}$ element and the $((N/2)+1)^{th}$ element in the second sub-antenna array. When N is an odd number, D is a distance between the $((N+1)/2+1)^{th}$ element in the first sub antenna array and the $((N+1)/2+1)^{th}$ element in the second sub-antenna array.

Figure 7:
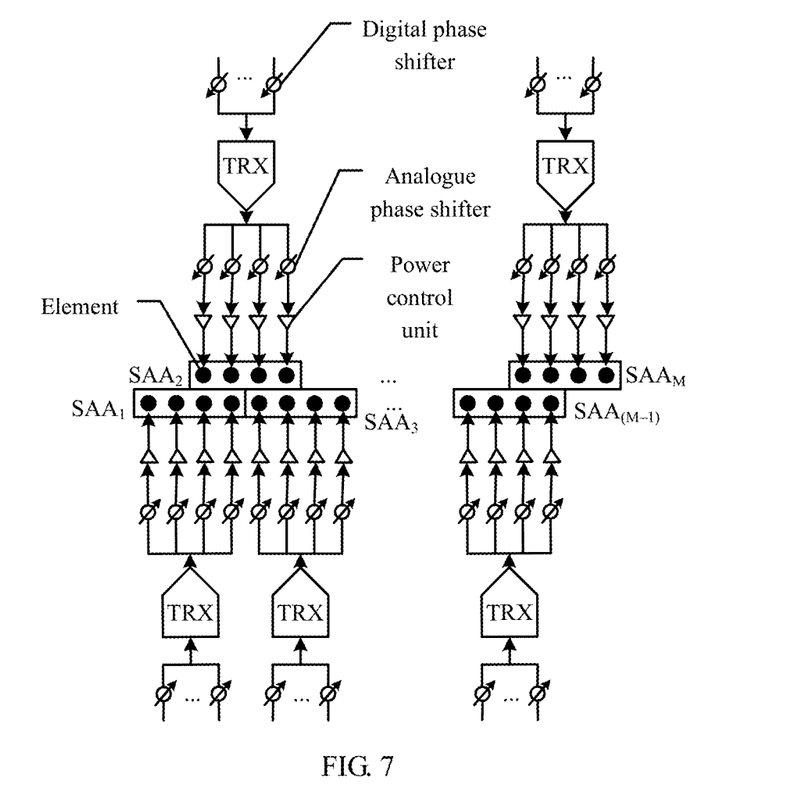
FIG. 7 is a second schematic diagram of a communications apparatus according to a first embodiment of the present disclosure.

In addition, each communications sublink in FIG. 5 may further include four power control units. For the communications apparatus after the four power control units are added to each communications sublink, refer to FIG. 7. In FIG. 7, each power control unit is connected between any analogue phase shifter of the four analogue phase shifters and one element of the four elements that communicates with the any analogue phase shifter. The four power control units are configured to perform constant-amplitude weighting processing on signals of radio wave beams sent to the four elements or signals of radio wave beams received from the four elements.

The power control unit in FIG. 7 may include a power divider, a power amplifier, a power attenuator, and the like. In an example, when the power control units are configured to perform amplitude weighting on the signals of the radio wave beams on the four elements according to coefficients 0.812, 1, 1, and 0.812, the amplitude weighting is called 30 dB Chebyshev amplitude weighting performed on the signals of the radio wave beams on the four elements. After the amplitude weighting processing is performed on signals of radio wave beams on different elements according to different coefficients, a directivity pattern gain of $AF_{SAA}$ can be controlled to be relatively low at a location at which $AF_{ALL}$ generates a grating lobe, so that an amplitude of a grating lobe of an eventually generated radio wave beam is controlled within a particular range.

In another example, amplitude weighting may be performed on the signals of the radio wave beams on the four elements in another amplitude weighting manner such as Kaiser amplitude weighting or Gausswin amplitude weighting.

Figure 8:
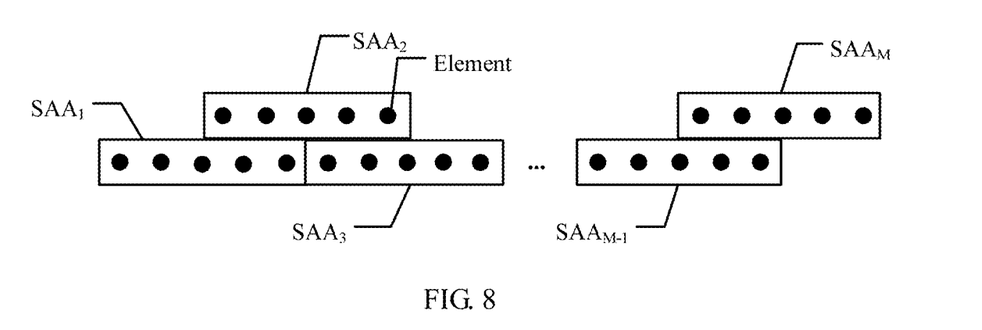
FIG. 8 is a schematic diagram of a manner of arranging adjacent sub antenna arrays according to the present disclosure.

It should be noted that, as an example, N is 4 in FIG. 5 or FIG. 7. In actual application, N may be another quantity. N may be, for example, 5, 6, 7, or 8, and this is not limited in the present disclosure. When N is an even number, for an arrangement manner in the communications apparatus, refer to FIG. 5. When N is an odd number, for example, N is 5, and when the distances between the any adjacent elements are the same (for example, the distances are d) and $D=(Nd)/2=2.5$ d, for a manner of arranging the adjacent sub antenna arrays in the communications apparatus, refer to FIG. 8. In FIG. 8, a distance D between $SAA_1$ and $SAA_2$ is a distance between the third element in $SAA_1$ and the third element in $SAA_2$, that is, $D=2.5$ d.

For the communications apparatus shown in FIG. 7, it is assumed that $M=4$ and $N=8$. When data streams $S_1$ and $S_2$ respectively in two directions at 5° and −2.163° (because a minimum distance between main lobes is 7.163 when an equivalent diameter is approximately $8\lambda$) are input to a wireless communications device, a phase $(J-1)*\delta$ is injected into the $J^{th}$ analogue phase shifter of N analogue phase shifters inside each SAA, J is a positive integer, and $J \leq N$; and a phase $(I-1)*\Delta$ is separately injected into L digital phase shifters of the $I^{th}$ communications sublink of the M communications sublinks, I is a positive integer, and $I \leq M$. That is, after values are assigned to an expression of a full-array factor and an expression of a sub-array factor, radio wave beams shown in FIG. 9 may be generated.

Figure 9:
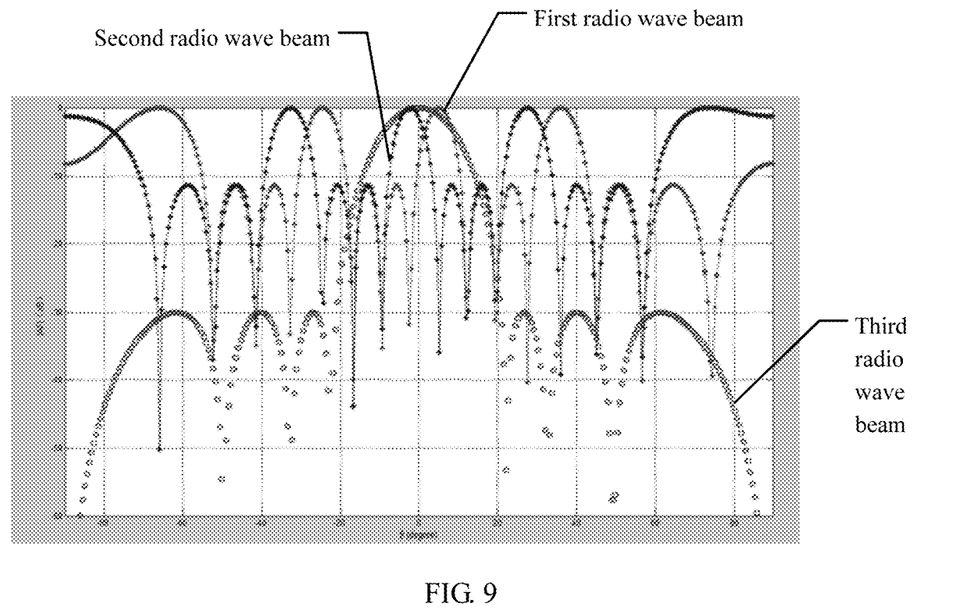
FIG. 9 is a first schematic diagram of a radio wave beam generated by a communications apparatus according to the present disclosure.

In FIG. 9, a first radio wave beam is a radio wave beam that is generated in a far field by using M large elements (each including N small elements) after the communications apparatus performs corresponding signal processing (including digital beamforming, analog beamforming, 30 dB Chebyshev weighting) on the data stream $S_1$, that is, a horizontal directivity pattern of a full-array factor of the data stream $S_1$. A second radio wave beam is a radio wave beam that is generated in the far field by using the M large elements (each including N small elements) after the communications apparatus performs the foregoing corresponding signal processing on the data stream $S_2$, that is, a horizontal directivity pattern of a full-array factor of the data stream $S_2$. A third radio wave beam is a radio wave beam that is generated in the far field by using M groups of N elements after the foregoing corresponding signal processing is performed on the data stream $S_1$ or the data stream $S_2$, that is, a horizontal directivity pattern of a sub-array factor of the data stream $S_1$ or the data stream $S_2$.

In FIG. 9, a peak (in a main direction) of the first radio wave beam is corresponding to an offpeak (at a null position) of the second radio wave beam, or a peak of the second radio wave beam is corresponding to an offpeak of the first radio wave beam. That is, no interference is caused between the radio wave beams. In addition, in this specification, that an antenna array is a linear array is used as an example. Therefore, a directivity pattern of the eventually generated radio wave beam is omnidirectional in a vertical direction. In actual design, when an antenna array is designed as a planar array, the antenna array may be adjusted and designed according to an actual requirement in a vertical direction.

Figure 10:
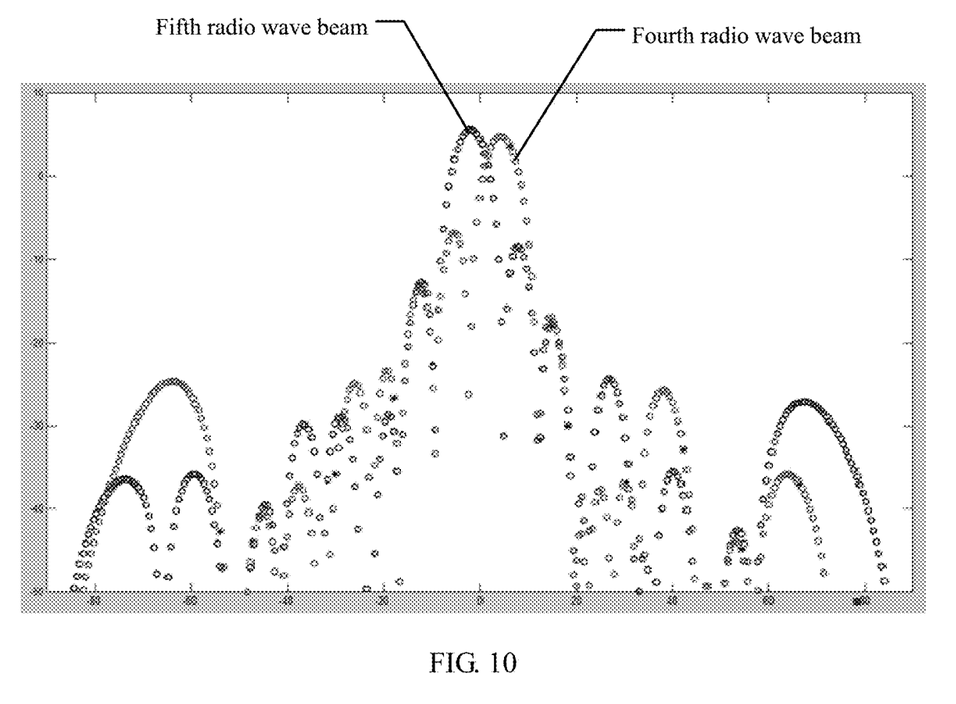
FIG. 10 is a second schematic diagram of a radio wave beam generated by a communications apparatus according to the present disclosure.

A radio wave beam eventually generated by the antenna array is a product of a full-array factor and a sub-array factor. Therefore, for two radio wave beams eventually generated by the antenna array for the data streams $S_1$ and $S_2$, refer to FIG. 10. FIG. 10 shows a directivity pattern of a fourth radio wave beam that is eventually generated after the communications apparatus performs the foregoing corresponding signal processing on the data stream $S_1$ and a directivity pattern of a fifth radio wave beam that is eventually generated after the communications apparatus performs the foregoing corresponding signal processing on the data stream $S_2$.

According to the communications apparatus provided in the first embodiment of the present disclosure, M sub antenna arrays of M communications sublinks are divided into at least two rows, and two adjacent sub antenna arrays are arranged in an interleaved manner. Therefore, when elements are increased, a distance between the sub antenna arrays can be shortened. This mitigates a contradiction between a large quantity of elements and a requirement for a short distance between the sub antenna arrays to some extent. For example, when a distance between the adjacent sub antenna arrays is Nd/2, and when a quantity of elements in each sub antenna array is increased by m, the distance between the sub antenna arrays is increased only by md/2. In addition, constant-amplitude weighting is performed on a signal of a radio wave beam on an element in each sub antenna array. When the distance between the sub antenna arrays is greater than 0.5λ, a grating lobe generated during deflection of an antenna array can be controlled within a particular range (that is, no grating lobe is generated). Therefore, orthogonality of the radio wave beam can be improved.

Figure 11:
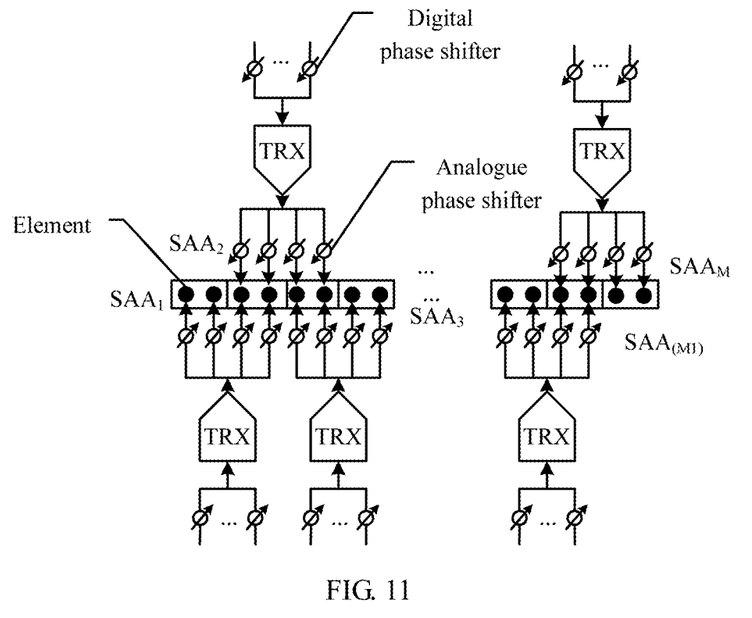
FIG. 11 is a first schematic diagram of a communications apparatus according to a second embodiment of the present disclosure.

FIG. 11 is a first schematic diagram of a communications apparatus according to the second embodiment of the present disclosure. In FIG. 11, the communications apparatus may include M communications sublinks. Each communications sublink may include one sub antenna array, N analogue phase shifters, X transceiver units, and L digital phase shifters. M, X, and L are all positive integers. N is an even number. L≤M, and X≤N. Preferably, X is 1. For ease of description, that N is 4 and X is 1 is used in FIG. 11 for description.

In FIG. 11, one sub antenna array includes four elements, configured to radiate or receive radio wave beams in space. Each analogue phase shifter of four analogue phase shifters communicates with any element of the four elements. The four analogue phase shifters are configured to control directions of the radio wave beams, radiated or received by the four elements, in the space. One transceiver unit communicates with the four analogue phase shifters. Specifically, the transceiver unit may communicate with the four analogue phase shifters by using one analog data stream interface. The transceiver unit is configured to: convert a digital data stream into signals of the radio wave beams or convert signals of the radio wave beams into a digital data stream. The L digital phase shifters communicate with the transceiver unit and are configured to: form the digital data stream, or receive the digital data stream and decompose the received digital data stream into multiple digital data streams.

In FIG. 11, M sub antenna arrays include $SAA_1$, $SAA_2$, ..., $SAA_M$. $SAA_1$, $SAA_2$, ..., and $SAA_M$ are arranged on a straight line. The first two elements in $SAA_2$ are the same as the last two elements in $SAA_1$, the first two elements in $SAA_3$ are the same as the last two elements in $SAA_2$, ..., and the first two elements in $SAA_{M-1}$ are the same as the last two elements in $SAA_M$.

It should be noted that, as an example, the communications apparatus in FIG. 11 includes four elements, and two adjacent sub antenna arrays share two elements. In actual application, the communications apparatus in FIG. 11 may further include another quantity of elements, for example, 8, 16, or another even number; and a quantity n of elements shared by the two adjacent sub antenna arrays is not limited to 2, provided that a condition 1≤n≤N/2 is satisfied. Preferably, n=N/2.

It may be understood that each element of n elements shared by the two adjacent sub antenna arrays is not only included in a first communications sublink to which a first sub antenna array belongs, but also included in a second communications sublink to which a second sub antenna array belongs. That is, each element of n elements shared by the two adjacent sub antenna arrays may not only communicate with an analogue phase shifter of the first communications sublink, but also communicate with an analogue phase shifter of the second communications sublink.

Preferably, when a distance between two adjacent elements of N elements in a same sub antenna array in FIG. 11 is denoted as $d_i$, a distance D between adjacent sub antenna arrays may satisfy the following condition:

$$\sum_{i=1}^{N-1} d_i/2 \le D < \sum_{i=1}^{N-1} d_i,$$

and i=1, 2, ..., N−1. It may be understood that, when distances between any adjacent elements are the same, $d_i$ may be denoted as d. Correspondingly, D may satisfy the following condition: (Nd)/2≤D<Nd. Preferably, D=(Nd)/2.

Figure 12:
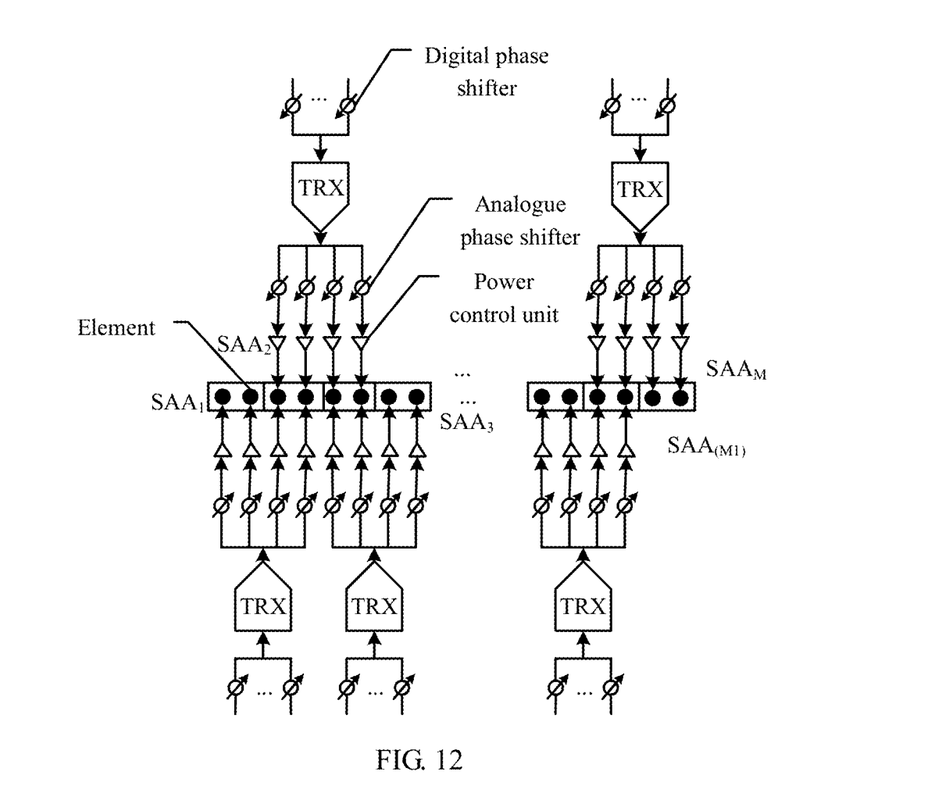
FIG. 12 is a second schematic diagram of a communications apparatus according to a second embodiment of the present disclosure.

In addition, in FIG. 11, each communications sublink may further include four power control units. For the communications apparatus after the four power control units are added to each communications sublink, refer to FIG. 12. In FIG. 12, each power control unit is connected between any analogue phase shifter of the four analogue phase shifters and one element of the four elements that communicates with the any analogue phase shifter. The four power control units are configured to perform constant-amplitude weighting processing on signals of radio wave beams sent to the four elements or signals of radio wave beams received from the four elements.

The power control unit in FIG. 12 may include a power divider, a power amplifier, a power attenuator, and the like. In an example, when the power control units are configured to perform amplitude weighting on signals on the four elements according to coefficients 0.812, 1, 1, and 0.812, the amplitude weighting is called 30 dB Chebyshev amplitude weighting performed on the signals on the four elements. After the amplitude weighting processing is performed on signals of radio wave beams on different elements according to different coefficients, a directivity pattern gain of $AF_{SAA}$ can be controlled to be relatively low at a location at which $AF_{ALL}$ generates a grating lobe, so that an amplitude of a grating lobe of an eventually generated radio wave beam is controlled within a particular range.

In another example, amplitude weighting may be performed on the signals on the four elements in another amplitude weighting manner such as Kaiser (Kaiser) amplitude weighting or Gausswin (Gausswin) amplitude weighting.

It should be noted that the communications apparatus shown in FIG. 11 or FIG. 12 may further include n*M radio frequency combiners and n*M radio splitters. When the two adjacent sub antenna arrays respectively belong to the first communications sublink and the second communications sublink, a connection relationship of each radio frequency combiner of the n*M radio frequency combiners is specifically as follows: Each radio frequency combiner is connected to any element of n elements and connected between one analogue phase shifter, communicating with the any element, of the first communications sublink and one analogue phase shifter, communicating with the any element, of the second communications sublink, and is configured to: combine signals of radio wave beams received by the two analogue phase shifters, and then send a combined signal to the any element. A connection relationship of each radio frequency splitter of the n*M radio splitters is specifically as follows: Each radio frequency splitter is connected to any element of the n elements and connected between one analogue phase shifter, communicating with the any element, of the first communications sublink and one analogue phase shifter, communicating with the any element, of the second communications sublink, and is configured to: split a signal of a radio wave beam received by the element, and then respectively send split signals to the two analogue phase shifters.

Figure 13:
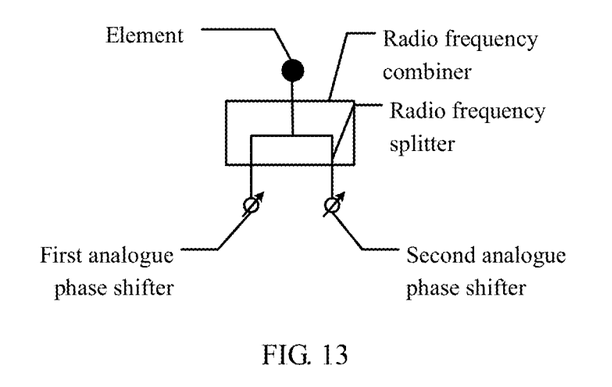
FIG. 13 is a schematic diagram of a connection relationship between a radio frequency combiner and a radio frequency splitter according to the present disclosure.

Connection relationships of one radio frequency combiner and one radio frequency splitter in the communications apparatus in FIG. 11 or FIG. 12 are used as an example for description. As shown in FIG. 13, an element in FIG. 13 may be any element of the n elements shared by the two adjacent sub antenna arrays. A first analogue phase shifter is an analogue phase shifter, communicating with the element, of the first communications sublink. A second analogue phase shifter is an analogue phase shifter, communicating with the element, of the second communications sublink.

For the communications apparatus shown in FIG. 12, it is assumed that M=4, and N=8. A phase $(J-1)*\delta$ is injected into the $J^{th}$ analogue phase shifter of the N analogue phase shifters inside each SAA, J is a positive integer, and J≤N. A phase $(I-1)*\Delta$ is separately injected into L digital phase shifters of the $I^{th}$ communications sublink of the M communications sublinks, I is a positive integer, and I≤M. That is, after values are assigned to an expression of a full-array factor and an expression of a sub-array factor, radio wave beams shown in FIG. 9 may be generated. For two eventually generated radio wave beams, refer to FIG. 10.

According to the communications apparatus provided in the second embodiment of the present disclosure, M sub antenna arrays of M communications sublinks are arranged on a straight line, and two adjacent sub antenna arrays share n elements. Therefore, when elements are increased, a distance between the sub antenna arrays can be shortened. This mitigates a contradiction between a large quantity of elements and a requirement for a short distance between the sub antenna arrays to some extent. For example, when a distance between the adjacent sub antenna arrays is Nd/2, and when a quantity of elements in each sub antenna array is increased by m, the distance between the sub antenna arrays is increased only by md/2. In addition, constant-amplitude weighting is performed on a signal of a radio wave beam on an element in each sub antenna array. When the distance between the sub antenna arrays is greater than 0.5λ, a grating lobe generated during deflection of an antenna array can be controlled within a particular range (that is, no grating lobe is generated). Therefore, orthogonality of the radio wave beam can be improved.

Finally, the present disclosure further provides a wireless communications device including the communications apparatus provided in the first embodiment of the present disclosure. Specifically, the wireless communications device may receive a radio wave beam from a user side or send a radio wave beam to a user side by using the communications apparatus provided in the first embodiment. In addition, the present disclosure further provides a wireless communications device including the communications apparatus provided in the second embodiment of the present disclosure. Likewise, the wireless communications device may receive a radio wave beam from a user side or send a radio wave beam to a user side by using the communications apparatus provided in the second embodiment.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present disclosure are further described in detail. It should be understood that the foregoing descriptions are merely specific implementations of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. A communications apparatus comprising:
   M communications sublinks, and each communications sublink comprises:
   one sub antenna array comprising N elements and configured to radiate or receive radio wave beams in space;
   N analogue phase shifters configured to communicate with any element of the N elements and to control directions of the radio wave beams, radiated or received by the N elements, in the space; and X transceiver units configured to communicate with the N analogue phase shifters and configured to:
  convert a digital data stream into signals of the radio wave beams; or
  convert signals of the radio wave beams into a digital data stream; and
L digital phase shifters configured to communicate with the X transceiver units and configured to:
  form the digital data stream; or
  receive the digital data stream and decompose the received digital data stream into multiple digital data streams,
wherein M sub antenna arrays of the M communications sublinks are divided into at least two rows, and two adjacent sub antenna arrays are arranged in an interleaved manner, N, M, X, and L are all positive integers, L≤M, and X≤N, and
wherein a distance between two adjacent elements of N elements in a same sub antenna array is $d_i$, a distance between the adjacent sub antenna arrays is D, $$\sum_{i=1}^{N-1} d_i/2 \leq D < \sum_{i=1}^{N-1} d_i,$$

and i=1, 2, . . . , N−1.

2. The communications apparatus according to claim 1, wherein:
  the M sub antenna arrays are divided into an upper row and a lower row, and the two adjacent sub antenna arrays respectively comprise a first sub antenna array and a second sub antenna array;
  when the first sub antenna array is located in the upper row and the second sub antenna array is located in the lower row, the second sub antenna array is located on a lower right of the first sub antenna array; and
  when the first sub antenna array is located in the lower row and the second sub antenna array is located in the upper row, the second sub antenna array is located on an upper right of the first sub antenna array.

3. The communications apparatus according to claim 1, wherein each communications sublink further comprises:
  N power control units, and each power control unit is connected between any analogue phase shifter of the N analogue phase shifters and one element of the N elements that communicates with the any analogue phase shifter,
  wherein the N power control units are configured to perform constant-amplitude weighting processing on signals of radio wave beams sent to the N elements or signals of radio wave beams received from the N elements.

4. The communications apparatus according to claim 1, wherein a phase (J−1)*δ is injected into the $J^{th}$ analogue phase shifter of the N analogue phase shifters of each communications sublink, J is a positive integer, and J≤N.

5. The communications apparatus according to claim 1, wherein a phase (I−1)*Δ is separately injected into L digital phase shifters of the $I^{th}$ communications sublink of the M communications sublinks, I is a positive integer, and I≤M.

6. A communications apparatus, comprising:
  M communications sublinks, and each communications sublink comprises:
    one sub antenna array comprising N elements and configured to radiate or receive radio wave beams in space;
    N analogue phase shifters configured to communicate with any element of the N elements and configured to control directions of the radio wave beams, radiated or received by the N elements, in the space; and
    X transceiver units configured to communicate with the N analogue phase shifters and configured to:
      convert a digital data stream into signals of the radio wave beams; or
      convert signals of the radio wave beams into a digital data stream;
    L digital phase shifters configured to communicate with the X transceiver units and configured to:
      form the digital data stream; or
      receive the digital data stream and decompose the received digital data stream into multiple digital data streams; and
    n*M radio frequency combiners and n*M radio splitters,
  wherein M sub antenna arrays of the M communications sublinks are arranged on a straight line, two adjacent sub antenna arrays share n elements, and the two adjacent sub antenna arrays respectively belong to a first communications sublink and a second communications sublink,
  wherein each radio frequency combiner of the n*M radio frequency combiners is connected to any element of the N elements, further connected between a first analogue phase shifter, of the N analogue phase shifters, communicating with any element of the first communications sublink and a second analogue phase shifter, of the N analogue phase shifters, communicating with any element of the second communications sublink, and configured to:
    combine signals of radio wave beams received by the first and second analogue phase shifters to form a combined signal, and then send the combined signal to the any element of the N elements, and
    split a signal of a radio wave beam received from the any element of the N elements into a first signal and a second signal, and then send the first signal to a first analogue phase shifter and send the second signal to a second analogue phase shifter, and
  wherein N is an even number, M, X, L, and n are all positive integers, L≤M, X≤N, and 1≤n≤N/2.

7. The communications apparatus according to claim 6, wherein:
  the two adjacent sub antenna arrays respectively comprise a first sub antenna array and a second sub antenna array;
  when the first sub antenna array is located ahead and the second sub antenna array is located behind, the first n elements of the second sub antenna array are the same as the last n elements of the first sub antenna array; and
  when the first sub antenna array is located behind and the second sub antenna array located ahead, the last n elements of the second sub antenna array are the same as the first n elements of the first sub antenna array.

8. The communications apparatus according to claim 6, wherein a distance between two adjacent elements of N elements in a same sub antenna array is $d_i$, a distance between the adjacent sub antenna arrays is D, $$\sum_{i=1}^{N-1} d_i/2 \leq D < \sum_{i=1}^{N-1} d_i,$$

and i=1, 2, . . . , N−1.

9. The communications apparatus according to claim 6, wherein:
  each communications sublink further comprises N power control units, and each power control unit is connected between any analogue phase shifter of the N analogue phase shifters and one element of the N elements that communicates with the any analogue phase shifter; and the N power control units are configured to perform constant-amplitude weighting processing on signals of radio wave beams sent to the N elements or signals of radio wave beams received from the N elements.

10. The communications apparatus according to claim 6, wherein a phase $(J-1)*\delta$ is injected into the $J^{th}$ analogue phase shifter of the N analogue phase shifters of each communications sublink, J is a positive integer, and J≤N.

11. The communications apparatus according to claim 6, wherein a phase $(I-1)*\Delta$ is separately injected into L digital phase shifters of the $I^{th}$ communications sublink of the M communications sublinks, I is a positive integer, and I≤M.

12. A communications apparatus, comprising:
M communications sublinks, and each communications sublink comprises:
  one sub antenna array comprising N elements and configured to radiate or receive radio wave beams in space;
  N analogue phase shifters configured to communicate with any element of the N elements and configured to control directions of the radio wave beams, radiated or received by the N elements, in the space; and
  X transceiver units configured to communicate with the N analogue phase shifters and configured to:
    convert a digital data stream into signals of the radio wave beams; or
    convert signals of the radio wave beams into a digital data stream; and
  L digital phase shifters configured to communicate with the X transceiver units and configured to:
    form the digital data stream; or
    receive the digital data stream and decompose the received digital data stream into multiple digital data streams,
wherein M sub antenna arrays of the M communications sublinks are arranged on a straight line, and two adjacent sub antenna arrays share n elements, N is an even number, M, X, L, and n are all positive integers, L≤M, X≤N, and 1≤n≤N/2, and
wherein a distance between two adjacent elements of N elements in a same sub antenna array is di, a distance between the adjacent sub antenna arrays is D, $$\sum_{i=1}^{N-1} d_i/2 \leq D < \sum_{i=1}^{N-1} d_i,$$

and i=1, 2, . . . , N−1.

* * * * *